(12) United States Patent
Pisoni

(10) Patent No.: US 7,460,587 B2
(45) Date of Patent: Dec. 2, 2008

(54) ELECTRONIC CIRCUIT FOR PERFORMING FRACTIONAL TIME DOMAIN INTERPOLATION AND RELATED DEVICES AND METHODS

(75) Inventor: Fabio Pisoni, Busto Garolfo (IT)

(73) Assignee: STMicroelectronics Belgium NV, Zaventem (BE)

( * ) Notice: Subject to any disclaimer, the term of this patent is extended or adjusted under 35 U.S.C. 154(b) by 730 days.

(21) Appl. No.: 10/745,948

(22) Filed: Dec. 24, 2003

(65) Prior Publication Data

US 2004/0254969 A1  Dec. 16, 2004

(30) Foreign Application Priority Data

Dec. 24, 2002  (EP) ................... 02447272

(51) Int. Cl.
  *H04B 1/38*  (2006.01)
  *H04L 5/16*  (2006.01)

(52) U.S. Cl. ............. 375/222; 375/260; 375/219; 375/220; 375/327; 375/376; 455/340; 455/75; 455/73

(58) Field of Classification Search ............. 375/355, 375/222, 260, 220, 219, 327, 373, 376; 708/404; 455/340, 75, 73
See application file for complete search history.

(56) References Cited

U.S. PATENT DOCUMENTS

| | | | | |
|---|---|---|---|---|
| 4,575,709 A | * | 3/1986 | Tomlinson | 341/110 |
| 4,882,668 A | * | 11/1989 | Schmid et al. | 708/1 |
| 5,228,062 A | * | 7/1993 | Bingham | 375/344 |
| 5,854,570 A | * | 12/1998 | Schmidt | 329/304 |
| 6,167,528 A | * | 12/2000 | Arcoleo | 713/501 |
| 6,218,896 B1 | * | 4/2001 | Becker et al. | 329/304 |
| 6,370,188 B1 | * | 4/2002 | Wu et al. | 375/222 |
| 6,433,673 B1 | * | 8/2002 | Yin et al. | 340/384.4 |
| 6,925,112 B1 | * | 8/2005 | Morejon et al. | 375/222 |

(Continued)

FOREIGN PATENT DOCUMENTS

| EP | 0853383 | 7/1998 |
|---|---|---|
| EP | 0797878 | 3/2002 |

OTHER PUBLICATIONS

Park et al., Analysis of the Jointly Adapting and Asynchronously Configured V.32 Modern Implementation, Signals Systems and Computers, 1991, 1991 Conference Record of the Twenty-Fifth Asilomar Conference on Pacific Grove, CA, USA, Nov. 4-6, 1991, Los Alamitos, CA, USA, IEEE Comput. Soc., US, pp. 683-688, XP010026389.

(Continued)

*Primary Examiner*—Phuong Phu
(74) *Attorney, Agent, or Firm*—Lisa K. Jorgenson; Allen, Dyer, Doppelt, Milbrath & Gilchrist

(57) ABSTRACT

A clock offset compensation arrangement may include a fractional interpolator for applying a trigonometric interpolation to a sampled input signal according to a clock offset signal. It uses transform-based processing in the frequency domain. Compared to a polynomial type interpolation it may be easier to implement, and may achieve a closer approximation to an ideal interpolation. It may reduce the effects of non-linear type errors introduced by truncation of higher powers. The arrangement may be applied to receivers or transmitters of multi-carrier modems, as well as other applications which use rate adaptation or synchronization.

37 Claims, 8 Drawing Sheets

U.S. PATENT DOCUMENTS

| | | | |
|---|---|---|---|
| 2003/0021208 A1* | 1/2003 | Ogura | 369/59.22 |
| 2003/0053410 A1* | 3/2003 | Williams et al. | 370/207 |
| 2003/0088418 A1* | 5/2003 | Kagoshima et al. | 704/258 |
| 2003/0108094 A1* | 6/2003 | Lai et al. | 375/222 |
| 2003/0149357 A1* | 8/2003 | Liu | 600/437 |
| 2004/0071251 A1* | 4/2004 | Sutioso et al. | 375/373 |

OTHER PUBLICATIONS

Park et al., A Novel Structure for Real-Time Digital Sample-Rate Converters with Finite Precision Error Analysis, Speech Processing 2, VLSI, Underwater Signal Processing, Toronto, May 14-17, 1991, International Conference on Acoustics, Speech & Signal Processing ICASSP, New York, IEEE, US, vol. 2 Conf. 16, pp. 3613-3616, XP010043651.

Rice et al., Loop Control Architectures for Symbol Timing Synchronization in Sampled Data Receivers, 2002 Milcom Proceedings; Global Information Grid - Enabling Transformation Through 21st Century Communications, Anaheim, CA, US, Oct. 7-10, 2003, IEEE Military Communications Conference Milcom 2002, pp. 987-991, XP002241728.

* cited by examiner

US 7,460,587 B2

ELECTRONIC CIRCUIT FOR PERFORMING FRACTIONAL TIME DOMAIN INTERPOLATION AND RELATED DEVICES AND METHODS

FIELD OF THE INVENTION

The present invention relates to telecommunications networks and, more particularly, to interpolators for use therein an related methods.

BACKGROUND OF THE INVENTION

Two exemplary modem communication systems which permit transmission of data over band-limited communication lines at very high rates (e.g., up to 52 Mbits/s) are the asymmetric high speed digital subscriber line (ADSL) and very high speed digital subscriber line (VDSL) systems. Further information on these system may be found in "ADSL, VDSL and Multi-carrier Modulation", J. A. C. Bingham, Wiley, 2000.

More particularly, the above-noted systems are examples of multi-carrier systems. Multi-carrier modulation is one way of transmitting digital data by splitting that data into fixed-length data "blocks" or "symbols," each having the same number of sub-blocks or bits. Analog transmission of these blocks is carried out using a set of carrier signals. There is a carrier for each of the sub-blocks in one block. The carriers have frequencies which are equally spaced across the transmission band of the transceiver. One such arrangement is called discrete multi-tone (DMT). DMT modems transmit data by dividing it into several interleaved bit streams, and these bit streams are used to modulate several carriers.

Another application of multi-carrier modulation is in orthogonal frequency division multiplexing (OFDM) systems, as described in "OFDM for Wireless Multimedia Communications", R. van Nee and R. Prasad, Artech House, 2000, for example. This modulation technique finds application in wireless local area networks (WLAN), as well as in satellite communications. See, e.g., "Satellite Communications Systems", G. Maral, M. Bousquet, Wiley, 1998.

By way of example, in a receiver for use in an ADSL system, following time domain equalization (TEQ), a removal of the cyclic prefix (CP) and a fast Fourier transform (FFT) (which is complementary to the inverse FFT (IFFT) of the transmitter) is performed. The signal may then be passed to a frequency domain equalizer (FDEQ) to recover the transmitted signals from the received signals (e.g., QAM symbols), from which the bit streams are recovered.

A significant drawback of this and other multiple carrier systems is the effect of clock offset on performance. ADSL standards require that client-side modems recover a master clock signal from the received data stream, and use this recovered clock to generate a jitter-free reverse link bitstream. This is done to ensure that the upstream transmission is received by the central office modem in a synchronized manner relative to the master clock signal.

Clock offset in the transmission path introduces a tone-dependent frequency shift and a sample-dependent time delay. It is conventionally addressed by carrying out a time domain interpolation (TDI) at the customer premises equipment (CPE) only for ADSL. The Central Office (CO) is the master and usually does not need TDI, but this is optional. The TDI is used to pre-compensate signals transmitted to, and post-compensate signals received from, the CPE side. Conventionally, this involves a polynomial (Lagrange) interpolation. See, e.g., "The Theory and Practice of Modem Design", J. A. C. Bingham, Wiley, 1988.

A definition of interpolation given in the foregoing book which is as follows: "given a set of M values $F_m$ with m=1 to M of a function F(t) generated by sampling at equally spaced values $t_m$ of time t, find an approximation to F(t) for t lying within the range of $t_m$." The simplest solution is to fit a polynomial of degree M−1 through the observed values of F(t). The offset is typically a very small proportion of the clock period, but very small uncorrected offsets have a disproportional effect on subsequent processing stages. This is because in a multi-carrier system SNR will drop dramatically due to ICI resulting from FFT of signals having any clock offset. Thus, as a polynomial fit is only an approximation to the actual signal, errors are automatically introduced because of the inaccurate fit between the polynomial approximation and the real signal.

The known TDI structure can be replicated in the transmitter (TX) for pre-compensation, using the same TDI structure used in the receiver. However, the TDI in the TX path may introduce noise at high frequency and non-linear behavior due to polynomial (Lagrange) interpolation which, in turn, may affect the performance of the local echo canceller and the remote channel equalizer. Also, it may be very expensive in terms of required computation.

U.S. Pat. No. 6,370,188 to Wu et al. discusses phase and frequency offset compensation in a telecommunications receiver. A pre-emphasis FIR filter function and a pre-emphasis phase rotation function are applied to an upstream signal, based upon the estimated phase offset and frequency offset. A transmit side includes an FIR filter function which receives a digital signal G(m), directly or indirectly, from a host computer. The FIR filter applies a pre-emphasis correction to the signal G(m), based upon the estimate of frequency offset between the master clock of a central office modem 100 and a receive clock. This frequency offset estimate is communicated to the FIR filter function by a phase and frequency offset detection function. This is an example of a polynomial type correction.

U.S. Pat. No. 6,101,230 to Chun et al. is directed to sampling clock signal recovery in a receiving terminal of a DMT system, in which additive white Gaussian noise (AWGN) induced jitter is a problem. To address this problem, the patent proposes removing AWGN from the receiving terminal of the DMT system, and stably recovering a sampling clock signal by first determining whether the phase error is smaller than a predetermined threshold value. If the phase error is equal to, or greater than the predetermined threshold value, then it corrects the sampling clock signal by the phase error. However, if the phase error is less than the predetermined threshold value, then it calculates an average value of some or all of decision error values, and corrects the sampling clock signal by the average value.

Published U.S. Patent application no. 2001/0019593 A1 to Greaves, David J. describes an xDSL sample rate compensation approach using phase balancing. It compares the local sampling rate with the reference sampling rate, determines the error in the local sample rate, and derives a timing recovery signal related to the magnitude of the error. It further divides the local clock rate by a factor related to the timing recovery signal to reduce the error. One or more samples is removed from or added to the received sample stream, at predetermined intervals, depending on the timing recovery signal to further reduce the error.

SUMMARY OF THE INVENTION

An object of the present invention to provide a clock offset compensation arrangement for compensating a sampled input signal. The arrangement may include a first input for receiving the sampled input signal, a second input for an estimated clock offset signal, and a fractional interpolator. The fractional interpolator is for applying a trigonometric interpolation to the sampled input signal according to the received estimated clock offset signal to output a clock offset compensated signal.

As used herein, the term "trigonometric interpolation" means fitting using trigonometric functions, such as sine, cosine, etc. to the sampled input signal. For example, if the Fourier coefficients of a frame of input samples are computed, then these coefficients, by way of an inverse Fourier transform, may be used to evaluate (interpolate) the input samples at any time and even fractionally related to the sampling period.

One aspect of the present invention is to provide a fast evaluator for the inverse Fourier transforms (i.e., a fast trigonometric interpolator) when the times of the interpolated samples are shifted with respect to the sampling period as caused by a clock offset. The fractional transform is preferably a fast fractional discrete Fourier transform. This is notable because, compared to a polynomial-type interpolation, it may be easier to implement. Further, since it is frame-oriented, more samples may be included in the computation (i.e., an entire frame) than would be possible with a TDI FIR whose history (FIR order) is normally limited to few samples, thus achieving a better interpolation.

It also has the notable advantage of enabling a reduction in the effects of non-linear type errors introduced by truncation of higher powers in a series polynomial approximation, as may arise in polynomial interpolation. A fractional interpolator is defined as one which operates in a transform domain, other than the time domain as do conventional interpolators, the transform domain not being limited to a Fourier transform or frequency domain. The arrangement may be applied to receivers or transmitters, or any application which needs rate adaptation or synchronization. In the case of multi-carrier modems, such compensation may be an alternative or a complement to existing VCXO or TDI correction. If complementary, the expensive VCXO may be replaced by a cheaper, less precise device, or the TDI may be implemented with less precision. As a result, it may be less computationally intensive.

The interpolator may be arranged to carry out linear transforms of blocks of the input signal. This may improve system error performance compared to non-linear techniques, as error from non-linear processing may have a negative impact on downstream processing elements such as equalizers. The processing by blocks (also called frames or symbols) is notable as it may help limit the amount of processing, e.g., FFT complexity scales with nlogn rather than $n^2$, where n is a length of the block.

The interpolator may operate on a frequency domain input and to output a time domain signal. This is convenient for particular applications to avoid the need for a separate frequency to time domain conversion. Other embodiments may also be used. By correcting in the frequency domain rather than time domain, high frequency noise and non-linear behavior arising from the time domain correction (interpolation) may be avoided, and computation load reduced.

Additionally, the interpolator may operate on a time domain input and output a time domain signal. This arrangement is more suitable for some applications, such as receiver-side processing and other generic applications, even independently from the type of modulation (DMT of OFDM) employed.

The interpolator may carry out an IFFT on the input signal in the frequency domain, followed by a chirp Z transform according to the clock offset, to output a frequency domain signal. This feature is useful to reduce the amount of processing, and it may be applied to a transmitter side of a modem before IFFT and CP addition stages, for example. It should be noted that other transforms may be used as well, e.g., a wavelet transform and its inverse as described in "Wavelets and subbands", A. Abbate et al., Birkhäuser, 2002. In the case of other transforms, the equivalent to the chirp Z transform is created in a similar manner.

The input signal may have at least one carrier signal. Particularly, where the input has multiple carriers which are orthogonal, good clock offset compensation is important to avoid loss of orthogonality and consequential lowering of SNR.

The interpolator may carry out a fast fractional Fourier transform, derived using time-frequency localization properties of analytic signals according to the clock offset, to output time domain signals. This enables the amount of processing to be reduced, and it may avoid the need for a subsequent frequency-to-time domain conversion in a transmitter, for example. As described above, other transforms are included within the scope of the present invention.

The interpolator may add a time domain guard band to separate blocks of the output by carrying out a separate fast fractional Fourier transform on a portion of the input and adding the result to the time domain output signals. This is useful for a transmitter side of a modem, for example, for adding a cyclic prefix.

The interpolator may also convert the input signal from time domain into a frequency domain, carry out a fast fractional Fourier transform derived using time-frequency localization properties of analytic signals according to the clock offset, and output a time domain signal. This enables the amount of processing to be reduced in a receiver side of a modem, for example.

The interpolator may further remove a time domain guard band between blocks of the input signal by carrying out a separate Fourier transform on a portion of the input signal, and concatenating the result with the time domain output signal. This may be useful for a receiver side of a modem, for example, for removing a cyclic prefix. It should be noted that the above-noted transforms may be approximated by a series expansion.

The present invention also relates to a transmitter which may have a modulator for modulating one or more carriers, a clocked output circuit, a clock offset estimator, and the compensation arrangement described above. In addition, a receiver in accordance with the invention may have a demodulator for recovering data from one or more carriers, a clocked input circuit, and the compensation arrangement described above.

Similarly, a modem in accordance with the invention may include such a transmitter and receiver. In accordance with another related embodiment, the modem may have the compensation arrangement in only one of the receiver and transmitter in the modem. By way of example, the modem may be fabricated as an integrated circuit. The present invention also relates to a central office or customer premises equipment having one or more of the modems described above, each for coupling a subscriber line to a telecommunications network.

Another aspect of the present invention is a fast-convolver using 2N points to emulate linear convolution through FFTs, as shown in FIG. 5. In particular, an N-points fractional Fourier transform arrangement or circuit may include at least one 2N-points fast Fourier transform block. In addition the circuit may include a plurality of 2N-points inverse fast Fourier transform blocks. This fractional Fourier transform arrangement may have wide and independent use beyond that of interpolation.

Another aspect of the present invention is a fast-convolving method using 2N point processing to emulate linear convolution through FFTs, as shown in FIG. 5. In particular, the method of N-points fractional Fourier transforming may include at least one 2N-points fast Fourier transform. In addition, the method may include a 2N-points inverse fast Fourier transform and a further 2N-points fast Fourier transform.

Another aspect of the present invention provides a rate adapter for digitally altering a sample rate of a sampled input stream. The adapter may include an input for a rate control signal, and a fractional interpolator for applying a trigonometric interpolation to blocks of the sampled input signal, in turn, according to the rate control signal.

This is advantageous in that it may be applied to receivers or transmitters, or other applications which need rate adaptation, for compensation or synchronization or other applications, for example. It may also be applied to data streams including audio or video data. In the rate adapter, the interpolator may operate in the frequency domain. Within the context of rate-adaptation, the input/output rates are offset in the range of tens/hundreds of parts per millions (ppm). The rate-adaptation is for a small range of frequency mismatch.

Another aspect of the invention relates to a corresponding method of fractional interpolation for clock offset compensation of a sampled input signal. The method may include receiving the sampled input signal, receiving an estimated clock offset signal, and applying a trigonometric interpolation to the sampled input signal according to the received estimated clock offset signal to obtain a clock offset compensated signal.

A further aspect of the invention relates to software for implementing the clock offset compensation arrangement described above. This may include software for carrying out (including controlling) corresponding method steps. An equalizer in the form of software may include software which runs on or controls "dumb" or standard hardware, to carry out the desired functions. Thus, the software essentially defines the functions of the equalizer, and may therefore be termed an equalizer, even before it is combined with its standard hardware. For similar reasons, it may also include software which "describes" or defines the configuration of hardware, such as hardware description language (HDL) software, as is used for designing silicon chips, or for configuring universal programmable chips, to carry out desired functions.

Still another aspect of the present invention relates to a method of offering a communication service over a network using the modem described above. It will be appreciated that the advantages set forth above may result in a network that is more reliable and/or flexible, has greater capacity, and/or more cost effective, for example. As such, a communication service provided over the network may show a corresponding improvement, and directly affect the value of such services. Such increased value over the life of the system may prove to be greater than the sales value of the equipment.

It will be appreciated that certain of the features described herein may be used with various of the aspects of the invention, as will be appreciated by those skilled in the art. Other advantages will also be appreciated by those skilled in the art.

BRIEF DESCRIPTION OF THE DRAWINGS

Embodiments of the invention will now be described by way of example with reference to the attached figures, in which:

FIGS. 3 through 6 are schematic block diagrams showing aspects of the clock compensation arrangement of FIG. 2 based upon fractional Fourier (chirp type) transforms;

DETAILED DESCRIPTION OF THE PREFERRED EMBODIMENTS

Figure 1:
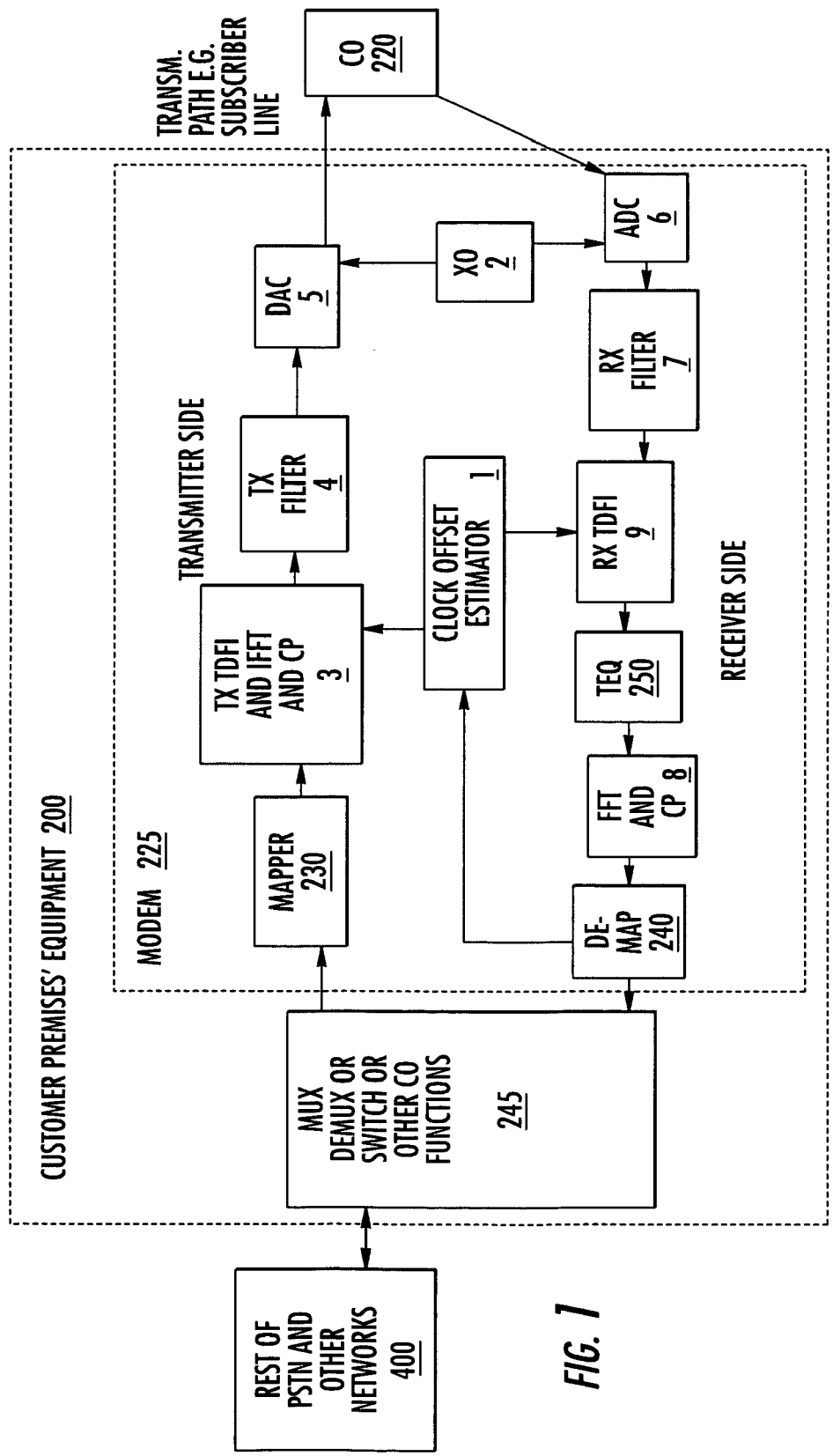
FIG. 1 is a schematic block diagram of a modem having a transform domain fractional interpolator (TDFI) clock offset compensation arrangement in accordance with the present invention.

In the drawings, and in the following description, like elements have been assigned like numerals for the sake of consistency. The present invention will be described with reference to certain embodiments and drawings, but the present invention is not limited thereto. Those skilled in the art will appreciate that the present invention has wide application as indicated by the attached claims, for example, in xDSL, VDSL, ADSL modems, satellite transmitters and receivers, and wireless local area network receivers or transmitters (e.g., using multi-carrier modulation such as OFDM).

For the foregoing discussion, the clock offset will be assumed to be perfectly estimated on a symbol-by-symbol time base, though in practice it is understood there will be some small error. Further, a rotor may be added into any of the embodiments of the present invention in addition to an interpolator to provide additional compensation according to the clock offset signal.

Before describing the various implementations of the compensation arrangement, a typical application will first be described. Turning now to FIG. 1, a modem 225 having clock offset compensation in accordance with the invention is first described. The modem 225 has a discrete multi-tone (DMT) transceiver, which includes a receiver side and a transmitter side employing a compensation arrangement TDFI 3, 9 according to respective embodiments of the present invention. The modem is located at a customer premises (CP) 200 coupled to a subscriber line for transmitting to, or receiving, from a central office 220.

The embodiments described herein are equally applicable at the central office side, or other types of multi-carrier communications links such as cable connections, wireless links, etc. The modem is shown incorporated in CP equipment having other functions 245 such as multiplexing (MUX), demultiplexing (DEMUX), or switching, to couple many subscriber lines via modems to the rest of the PSTN or other networks 400.

The transmitter side has a mapper 230 for receiving data to be modulated and transmitted, and a signal output for outputting transmit signals to a digital-to-analog converter (DAC) 5 for subsequent transmission. The receiver side has a receive signal input for receiving signals transmitted from remote transceivers via an analog-to-digital converter (ADC) 6, and a receive data output for outputting dispersion suppressed received data to a demapper 240. A transmission path exists from the transmitter portion output to the CO 220, and another exists in the reverse direction to the receiver portion input along the subscriber line. The path includes at least a hybrid transformer (not shown) of the transceiver and may include other elements of the transceiver located outside the transmitter portion and the receiver portion of the transceiver.

In the transmitter side, the mapper feeds a TX (transmitter) TDFI (transform domain fractional interpolator) 3 which also has an inverse fast Fourier transform unit (IFFT) and cyclic prefix part CP for adding a guard band in the form of a cyclic prefix between each block or symbol. This part receives input data in the form of frequency-domain DMT data blocks including N complex-valued data elements from the mapper. The TDFI carries out clock-offset compensation as described below, according to a clock offset output by estimator 1, derived from received signals. The IFFT part modulates each of the N data elements with N carrier signals at evenly spaced frequency intervals to convert the N frequency-domain data elements into a block (or "symbol") of N real-valued time-domain samples.

The cyclic prefix part (CP) copies the last L samples of the N time-domain sample block to form a cyclic prefix therewith, and pre-pends the cyclic prefix to the beginning of the block. This is done to reduce inter-block interference at the remote transceiver to which the block of (N+L) samples is subsequently transmitted. The output of the cyclic prefix part is DMT transmit signals including a plurality of time-domain multi-carrier transmit blocks/symbols. The DMT transmit signals are subsequently passed through a transmitter low-pass filter unit 4, and then through the digital-to-analog converter DAC 5 prior to duplex transmission to the remote transceiver.

The receiver portion input is coupled to the analog-to-digital converter (ADC) 6 arranged to digitize DMT time-domain signals received from a remote transceiver, and to pass the digitized signals through a receiver filter 7. Before time domain equalization is applied by TEQ 250, clock offset is compensated by the RX (receive side) transform domain fractional interpolator (TDFI) to the signals output form the receive filter 7. As in the transmit side, this is carried out according to the clock offset signal from the estimator 1. After time domain equalization, an FFT and CP part removes the cyclic prefix guard band and converts the signal into frequency domain signals.

These signals are fed to the demapper 240 to produce demodulated data samples following conventional principles. The output of the receiver side of the modem is passed on to other parts of the central office equipment for onward routing and transmission. Other parts of the modem such as echo cancellation, etc., are not shown for the sake of clarity. The data transmitted may be anything including digitized voice call information, packet data relating to Internet access, or any other type of communication service.

Figure 2:
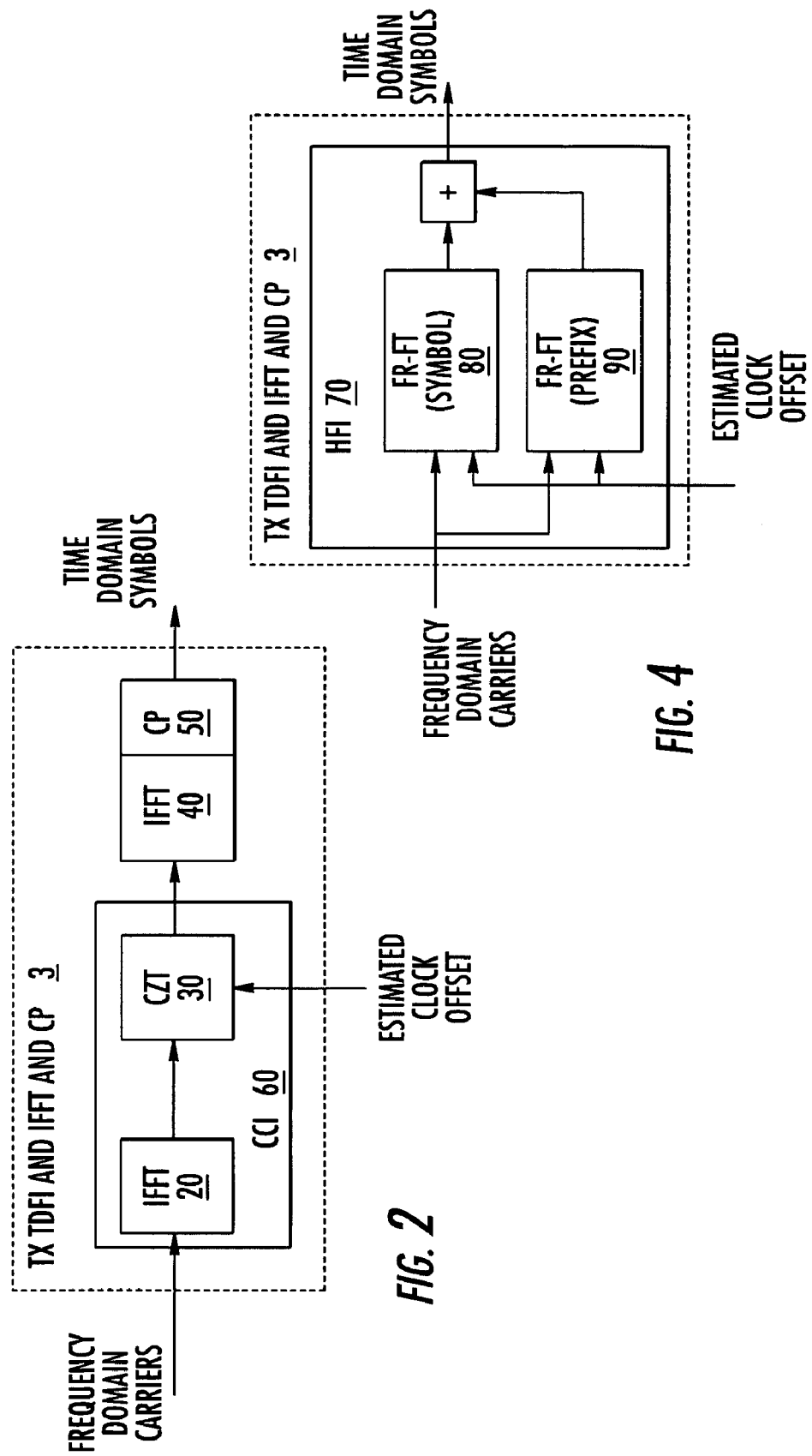
FIG. 2 is a schematic block diagram of a clock offset compensation arrangement based on chirp carrier interpolation in accordance with the present invention.

Turning now to FIG. 2, an embodiment of a compensation arrangement according to the invention is now described. This embodiment is one of a number of ways of implementing the TX TDFI and IFFT and CP 3 of FIG. 1, or it may be used in other applications. A chirp carrier interpolator (CCI) 60 feeds an IFFT 40, which is followed by a CP 50. The CCI includes another IFFT 20 in series with a chirp Z transformer (CZT) 30. The CCI part takes frequency domain inputs and carries out a clock offset compensation digitally in a transform domain based on linear Fourier and Z-chirp transforms.

The transforms are chosen to minimize computational load. An explanation of their derivation now follows, starting with an analysis of the effects of clock offset. The term "chirp" refers to changes in the frequency of a signal with time.

Clock offset introduces a tone-dependant frequency shift and a sample-dependant time delay. A non-oversampled system (NFt=FO) is assumed, and the following definitions are used:

T0=the nominal sampling period at TX @2.208 MHz;
Ts=the real sampling period at RX ADC; and
ppm=the precision mismatch (worst case for ADSL ppm=250).

$$k, n = 0 \ldots N-1$$

$$10^6 \cdot T_0 = (10^6 - \text{ppm}) \cdot T_S$$

$$F_0 = \frac{1}{T_0} \quad F_S = \frac{1}{T_S}$$

$$F_S = F_0 \frac{10^6 - \text{ppm}}{10^6} = F_0 \left(1 - \frac{\text{ppm}}{10^6}\right)$$

$$T_S = T_0 \left(\frac{10^6}{10^6 - \text{ppm}}\right)$$

$$\Delta F_T = \frac{F_S - F_0}{N} = -\frac{1}{N} F_0 \frac{\text{ppm}}{10^6}$$

$$\Delta T = T_S - T_0 = T_0 \left(\frac{\text{ppm}}{10^6 - \text{ppm}}\right)$$

The sub-carrier frequency offset for the sub-carrier k, and the time-delay accumulated at sample n and the corresponding new grids k' and n' are:

$$\Delta f_k = k \cdot \Delta F_T = -\frac{k}{N} F_0 \frac{\text{ppm}}{10^6} \quad \Delta t_n = n \cdot \Delta T = n \cdot T_0 \left(\frac{\text{ppm}}{10^6 - \text{ppm}}\right)$$

$$k' = k + \frac{\Delta f_k}{F_T} = k\alpha \qquad n' = n + \frac{\Delta t_n}{T_0} = \frac{n}{\alpha}$$

$$\alpha = 1 - \frac{\text{ppm}}{10^6}$$

The phase offset introduced by varying the carrier k or sample n (and keeping the other constant) is:

$$\Phi(n, k) = 2\pi \cdot f_k t_n \quad k, n = 0 \ldots N-1$$

$$\Delta \Phi_n(k) = 2\pi \cdot \Delta f_k t_n$$
$$= 2\pi \left(-\frac{k}{N} F_0 \frac{\text{ppm}}{10^6}\right) \cdot \bar{n} T_0$$
$$= -\frac{2\pi}{N} k \bar{n} \frac{\text{ppm}}{10^6}$$
$$= -\frac{2\pi}{N} k \bar{n} (1 - \alpha)$$

$$\Delta \Phi_{\bar{k}}(n) = 2\pi \cdot f \Delta_k t_n$$
$$= 2\pi \left(\bar{k} \frac{F_0}{N}\right) \cdot n T_0$$
$$= \frac{\text{ppm}}{10^6 - \text{ppm}}$$
$$= \frac{2\pi}{N} \bar{k} n \frac{\text{ppm}}{10^6 - \text{ppm}} = \frac{2\pi}{N} \bar{k} n \left(\frac{1-\alpha}{\alpha}\right)$$

For chirp carrier interpolation, the frequency interpolation formula given its samples is (DC at index k/2+1, N is even):

$$X(\omega) = \frac{1-e^{-j\omega N}}{N} \sum_{k=-N/2}^{N/2-1} \frac{X(k)}{1-e^{-j(\omega-2\pi k/N)}}$$

Evaluating on the fractional grid hα:

$$\omega(h\alpha) = 2\pi h\alpha/N \quad h = -N/2 \ldots +N/2-1$$

$$X(h\alpha) = \frac{1-e^{-j2\pi h\alpha}}{N} \sum_{k=-N/2}^{N/2-1} \frac{X(h)}{1-e^{-j2\pi/N(h\alpha-k)}}$$

The following chirp Z-Transform may be defined over the time-sequence x(n):

$$r_0 = R_0 = 1 \quad \vartheta_0 = 0 \quad \Phi_0 = 2\pi\alpha/N$$

$$X_c(m) = r_0 e^{j\vartheta_0} \sum_{n=0}^{N-1} x(n) e^{-j\Phi_0 k}$$

$$= \sum_{n=0}^{N-1} x(n) e^{-j2\pi k\alpha m/N}$$

Given an aliased form Xa of X (DC is at index 0 Xa=fftshift (X)):

$$X_c(m) = \sum_{n=0}^{N-1} x(n) e^{-j2\pi m\alpha n/N}$$

$$= \sum_{n=0}^{N-1} \left[\sum_{k=0}^{N-1} X_a(k) e^{j2kn/N}\right] \cdot e^{-j2\pi m\alpha n/N}$$

$$= \sum_{k=0}^{N-1} X_a(k) \cdot \sum_{n=0}^{N-1} e^{j2\pi(k-m\alpha)n/N}$$

$$= \frac{1}{N} \sum_{k=0}^{N-1} X_a(k) \frac{1-e^{j2\pi(k-m\alpha)}}{1-e^{j2\pi(k-m\alpha)/N}}$$

$$= \frac{1-e^{-j2\pi m\alpha}}{N} \sum_{k=0}^{N-1} \frac{X_a(k)}{1-e^{-j2\pi(m\alpha-k)/N}}$$

$$= \frac{1-e^{-j2\pi m\alpha}}{N} \sum_{k=-N/2}^{N/2-1} \frac{X(k)}{1-e^{-j2\pi(m\alpha-k)/N}} = X(m\alpha)$$

Thus, the interpolated carriers on the fractional grid kα (where α is a non-integer number) may be efficiently computed from the carriers X on the normal grid k by an inverse-FFT over X followed by a chirp Z-Transform. This result is particularly useful because fast implementations of the chirp Z-Transform transform exist with complexity O(N*log(N)), which enables computational load to be reduced.

Based on this result, the CCI takes as an input the carriers to be transmitted and interpolates them on a fractional grid based on the estimated clock offset. The interpolated carriers are then fed to the normal IFFT without needing an additional TDI part. The cyclic prefix has to be chirped independently.

The CCI is specified by the following "Matlab" function:
% X=carrier input (non-aliased format);
% Xw=interpolated carrier (non-aliased format);
% ppm=clock mismatch
%
function Xw=cci_interp(X, ppm) alpha=1−ppm/1e6;
N=length(X);
w=exp(−sqrt(−1)*2*pi/N*alpha);
A=exp(−sqrt(−1)*2*pi/N*(N/2)*alpha);
x=ifft(fftshift(X));
Xw=czt(x, N, w, A);
Xw(1)=1/N*sum(X),
% return;

An alternative way of implementing the TX TDFI and IFFT and CP 3 of FIG. 1 will now be described with reference to FIGS. 3-6. This alternative may be used in other applications. It is based on a different type of transform, using Hilbert fractional interpolation, and in the TX path it may operate on frequency domain carriers as an input and output time-domain signals.

Given a time domain causal signal xk(n) n=0 . . . N−1, the instantaneous phase is defined as the phase of the correspondent analytic signal, where HT(x) indicates the Hilbert transform of x:

$$\Phi_k(n) = \arg(x_k(n) + j \cdot HT(x_k(n))) \ n = 0 \ldots N-1$$

When a single tone k is passed through the IFFT, and a clock offset of parts per million (ppm) is present, then the instantaneous phase of the time-domain analytic signal will be given the following offset:

$$\Delta\Phi_k(n) = \frac{2\pi}{N} kn \frac{1-\alpha}{\alpha} \quad k, n = 0 \ldots N-1$$

$$\alpha = 1 - \frac{ppm}{10^6}$$

Figure 3:
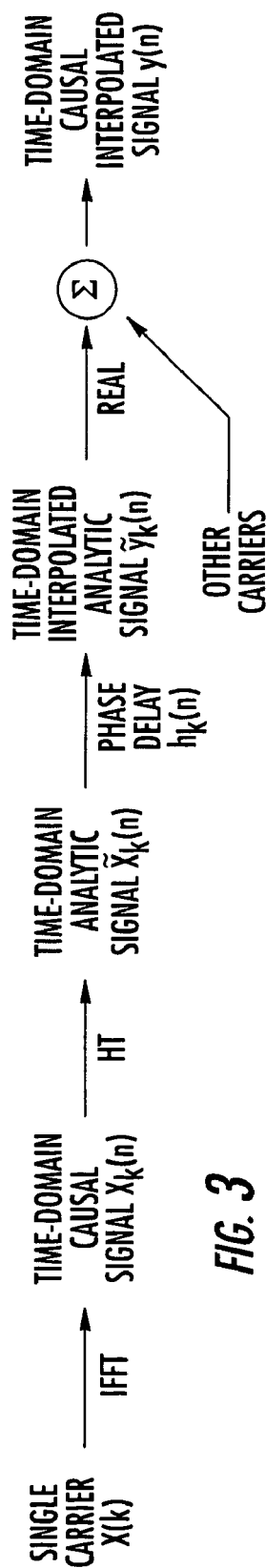

For single-tone analytic signals in particular, the phase is localized in time. The phase delay effect may be easily computed as a vector product by hk(n). As the Hilbert and Fourier transforms are linear, each analytic single tone component may be delayed separately and then summed together. The principle is shown in FIG. 3. This shows how a single carrier is subject to an IFFT to give a time-domain causal signal. This is subject to a Hilbert transform to give a time domain analytic signal, which after a phase delay becomes a time domain interpolated analytic signal. The same signals derived from other carriers may be summed to give the output, a time domain causal interpolated signal. Following the signal names shown in FIG. 3, the expression for the interpolated (causal) signal xw(n) is obtained as follows:

$$\tilde{x}_k(n) = \frac{2}{N} X(k) \cdot \exp\left(j\frac{2\pi}{N}kn\right)$$

$$h_k(n) = \exp(j \cdot \Delta\Phi_k(n)) = \exp\left(j\frac{2\pi}{N}kn\frac{1-\alpha}{\alpha}\right)$$

$$y(n) = \sum_{k=0}^{N/2-1} \tilde{x}_k(n) \cdot h_k(n) = \frac{2}{N} \sum_{k=0}^{N/2-1} X(k) \cdot \exp\left(j\frac{2\pi}{N}nk\frac{1}{\alpha}\right)$$

The fractional-Fourier transform Gk of δ over a generic signal s(k) is defined as follows (different definitions for the FRFT exist, the one used here is indeed a chirp-Z-transform):

$$G_k(s(k),\delta) = \sum_{k=0}^{N-1} s(k) \cdot \exp(-j2\pi nk\delta) \, k = 0 \ldots N-1$$

Hence, by comparing this definition with the expression of y(n), it may be seen that the (causal) interpolated signal y(n) may be obtained by a fractional Fourier transform (real part of) over the single side spectrum $\tilde{X}_s(k)$ k=0 ... N−1 obtained by X(k) as follows (the DC component has to be halved as the number of carriers is even, and the Nyquist carrier is assumed to be zero):

$$\tilde{X}_S(k) = \begin{cases} X(k)/2 & k = 0 \\ X(k) & k = 1 \ldots N/2-1 \\ 0 & k = N/2 \ldots N-1 \end{cases}$$

$$y(n) = \frac{2}{N} G_k\left(\tilde{X}_S(k), \frac{-1}{\alpha N}\right) \quad k = 0 \ldots N-1$$

As before, this is valuable because fast implementations of the fractional Fourier transform exists with complexity O(N*log2(N)), so this may enable computational load to be eased. An implementation of the fast fractional Fourier algorithm is specified in the following Matlab function for both even and odd length of the vector x:

```
%
% Fast fractional Fourier transform
% return Gk(x,alpha) with k=0 . . . N−1
% where:
% N=length(x) (even case)
% N=length(x)−1 (odd case)
%
function G=fast_frf(x, alpha)
M=length(x);
if (mod (M,2))
N=M−1; % x odd length
P=N−1;
else
N=M; % x even length
P=N;
end
y=[x.'.*exp(−sqrt(−1)*pi*(0:M−1).^2*alpha), zeros(1,P)].';
z=[exp(sqrt(−1)*pi*(0:N−1).^2*alpha), exp(sqrt(−1)*pi*(N:−1:1).^2*alpha)].';
w=ifft(fft(y).*fft(z));
G=w(1:N).*exp(−sqrt(−1)*pi*(0:N−1).^2*alpha).';
return;
```

The normal direct/inverse Fourier transform may be obtained as special cases:

$$\left.\begin{array}{l} fft(x) = \text{fast\_frf}(x, 1/N) \\ ifft(x) = \frac{1}{N}\text{fast\_frf}(x, -1/N) \end{array}\right\} \forall x(n), n = 1 \ldots N$$

The Hilbert fractional interpolator (HFI) is represented by the following Matlab function:

```
% Hilbert Fractional Interpolator . . .
% XY=input carriers (from 0 . . . N/2)
% y=time-domain interpolated signal
% ppm=clock mismatch
%
function y=hfi_interp(XY, ppm)
alpha=1−ppm/1e6;
N=length(XY)*2;
y=2/N*real(fast_frf([XY(1)/2; XY(2:end); zeros(N/2,1)], −1/alpha/N));
return;
```

The cyclic-prefix insertion is a non-linear operation. In a clock-mismatched transmitter this cannot be done simply by pre-pending the last CP samples as the stretch/shrink effects of the clock offset will be different at the beginning and at the end of the symbol. Two effects have to be accounted for when the prefix is inserted: a) the actual N-samples symbol starts CP samples later, which introduces an additional phase offset; and b) the prefix cannot be copied from the interpolated samples and must be interpolated separately.

The first effect is addressed with an additional phase-delay of D samples in hk(n):

$$\tilde{x}_k(n) = \frac{2}{N} X(k) \cdot \exp\left(j\frac{2\pi}{N}kn\right) \quad \text{(Equation 1)}$$

$$h_{D,k}(n) = \exp(j \cdot \Delta\Phi_k(n+D)) = \exp\left(j\frac{2\pi}{N}k(n+D)\frac{1-\alpha}{\alpha}\right)$$

$$y_D(n) = \sum_{k=0}^{N/2-1} \tilde{x}_k(n) \cdot h_{D,k}(n)$$

$$= \frac{2}{N}\sum_{k=0}^{N/2-1} X(k) \cdot \exp\left(j\frac{2\pi}{N}kD\frac{1-\alpha}{\alpha}\right) \cdot \exp\left(j\frac{2\pi}{N}kn\frac{1}{\alpha}\right)$$

The second effect is addressed with an additional fractional Fourier call over the same carriers. The idea is to have a zero-phase offset at the sample N−CP as this will become the first interpolated sample. This may be obtained with a negative delay of −(N−CP) samples and keeping only the output samples from N−CP to N−1 as interpolated prefix. In both cases, the main tool is the delayed fractional Hilbert interpolator defined by (Equation 1) and implemented by the following Matlab function:

```
% Delayed Hilbert Fractional Interpolator.
% XY=input carriers (from 0 . . . N/2)
% y=time-domain interpolated signal
% ppm=clock mismatch
% delay=in samples (ex. N−CP+1)
%
function y=delay_hfi_interp(XY, ppm, delay)
alpha=1−ppm/1e6;
N=length(XY)*2;
Xd=[XY(1)/2; XY(2:end); zeros(N/2,1)];
Xd=Xd.*exp(sqrt(−1)*2*pi/N*(0:N−1)*delay*(1/alpha−1)).';
y=2/N*real(fast_frf(Xd, −1/alpha/N));
return;
```

The interpolated prefix y_p and the N-samples symbol y_n are then obtained with two fractional Fourier calls over the same carriers with different delays:

```
N=512; CP=32; ppm=251; % xy=carriers 0 . . . N/2
y_p=delay_hfi_interp(xy,ppm, −(N−CP));
y_p=y_p(N−CP+1:end); % CP samples prefix
y_n=delay_hfi_interp(xy,ppm,CP); % N samples symbol
```

Figure 5:
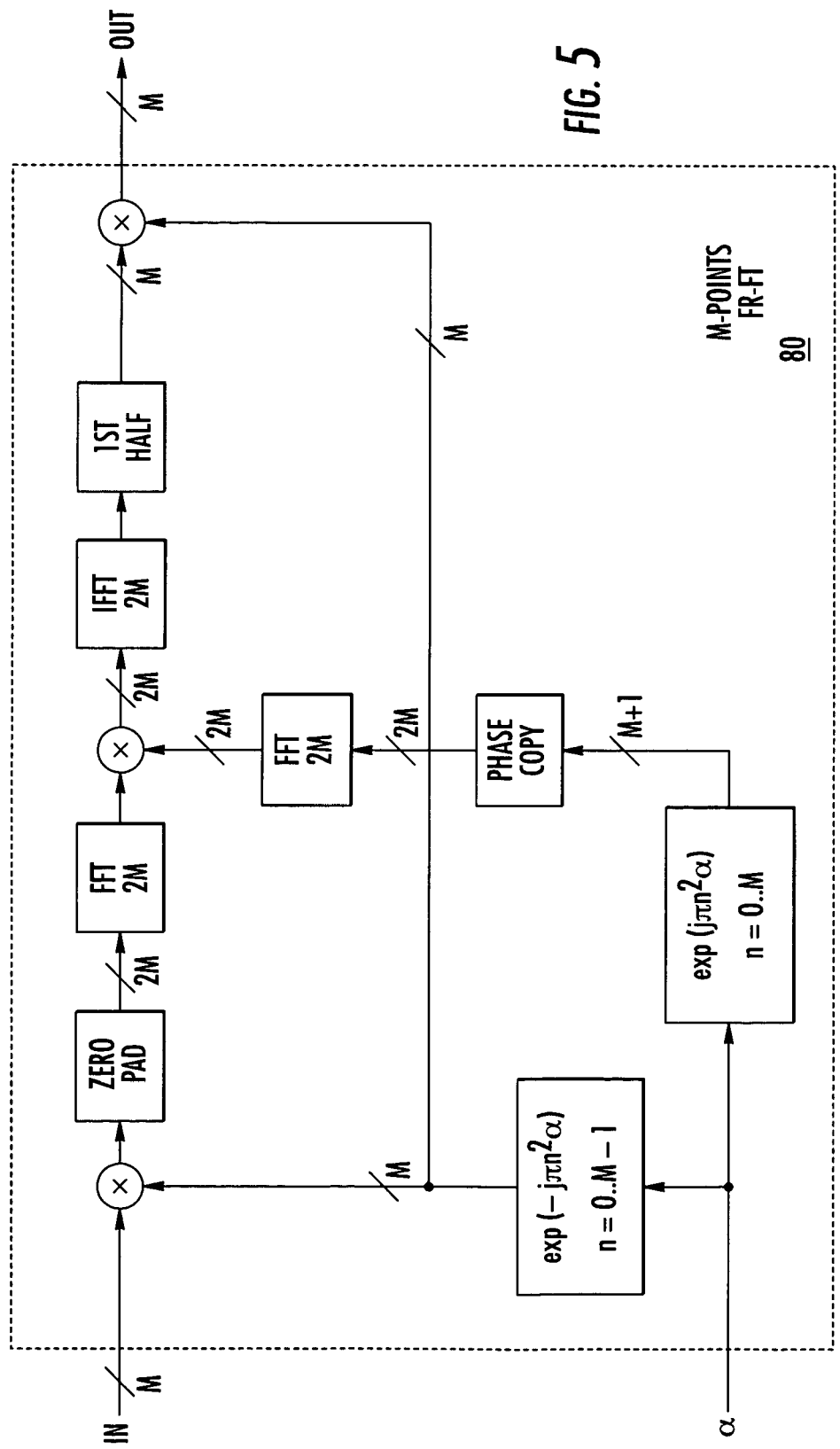

The complete TX HFI interpolator for the TX path involves combining the interpolation of the symbol and prefix in a single block/function 70, as shown in FIG. 4. There is some scope for reducing redundancy by sharing common exponential factors as shown in FIG. 5. The resulting DMT HFI Interpolator for the TX path (from carriers to time-domain) is specified by the following Matlab function. The arguments are the same as before, where CP specifies the length of the prefix in samples (i.e. 32 for ADSL). Here, yn and yp are the output (fractionally interpolated) symbol and prefix. The two 2N-points fast convolutions have been compacted in a single Matlab function. The pre and post exponential factors (variables A,B,C) are shared between symbol and prefix fast convolvers.

```
% DMT Hilbert Fractional Interpolator . . .
% XY=input carriers (tones 0 . . . N/2-1)
% ppm=clock mismatch
% CP=cyclix prefix size in samples
% [yn,yp]=interpolated symbol,prefix
%
function [yn, yp]=dmt_hfi_interp(XY, ppm, CP)
N=length(XY)*2;
alpha=1-ppm/1e6;
gamma=-1/alpha/N;
Xs=[XY(1)/2; XY(2:end)];
Xn=[Xs.*exp(sqrt(-1)*2*pi/N*(0:N/2-1)*(CP)*(1/alpha-1)).';zeros(N/2,1)];
Xp=[Xs.*exp(sqrt(-1)*2*pi/N*(0:N/2-1)*(CP-N)*(1/alpha-1)).';zeros(N/2,1)];
  A=exp(-sqrt(-1)*pi*(0:N-1).^2*gamma).';
  B=exp(sqrt(-1)*pi*(0:N).^2*gamma).';
  B=fft([B; B(end-1:-1:2)]);
  C=A(1:N);
  an=[Xn.*A; zeros(N,1)];
  bn=ifft(fft(an).*B);
  yn=2/N*real(bn(1:N).*C);
  ap=[Xp.*A; zeros(N,1)];
  bp=ifft(fft(ap).*B);
  yp=2/N*real(bp(1:N).*C);
  yp=yp(N-CP+1:N);
  return;
```

The foregoing is suitable for a fast hardware implementation of the HFI that employs standard FFT blocks and multipliers. Implementation of the HFI interpolator in the TX path may be done with two fractional Fourier transform (FRFT) calls, from the carrier domain, directly to the fractional time-domain grid, without an additional TDI in the TX path. This is represented in FIG. 4, which shows that the HFI 70 includes an FR-FT block 80 for processing the symbol, and a second block 90 for processing the prefix. Both have as inputs the frequency domain carriers and the clock offset estimate. The outputs of the blocks are combined by block 85. Prefix insertion involves pre-pending some samples at the beginning of the DMT frame. In producing the time domain output having the prefix, the result is a DMT frame longer in time, but the values are the same as before.

Each FR-FT block in FIG. 4 may be implemented following the Matlab function fast_frf( ) as shown in FIG. 5. An M-point fractional Fourier is obtained using several 2M-points traditional Fourier transforms. In this figure, the signal path is fed through a series of blocks including a first multiplier, a zero pad, an FFT 2m, a second multiplier, an IFFT 2M, a first half element, and a third multiplier. The first and third multipliers have as their other inputs a value $\exp(-j\pi n^2 \alpha)$ for n=0:M-1, derived from the clock offset signal represented by $\alpha$. The second multiplier has as its other input the value $\exp(j\pi n^2 \alpha)$ for n=0:M, after that value is subjected to a phase copy and an FFT 2M operation.

Figure 6:
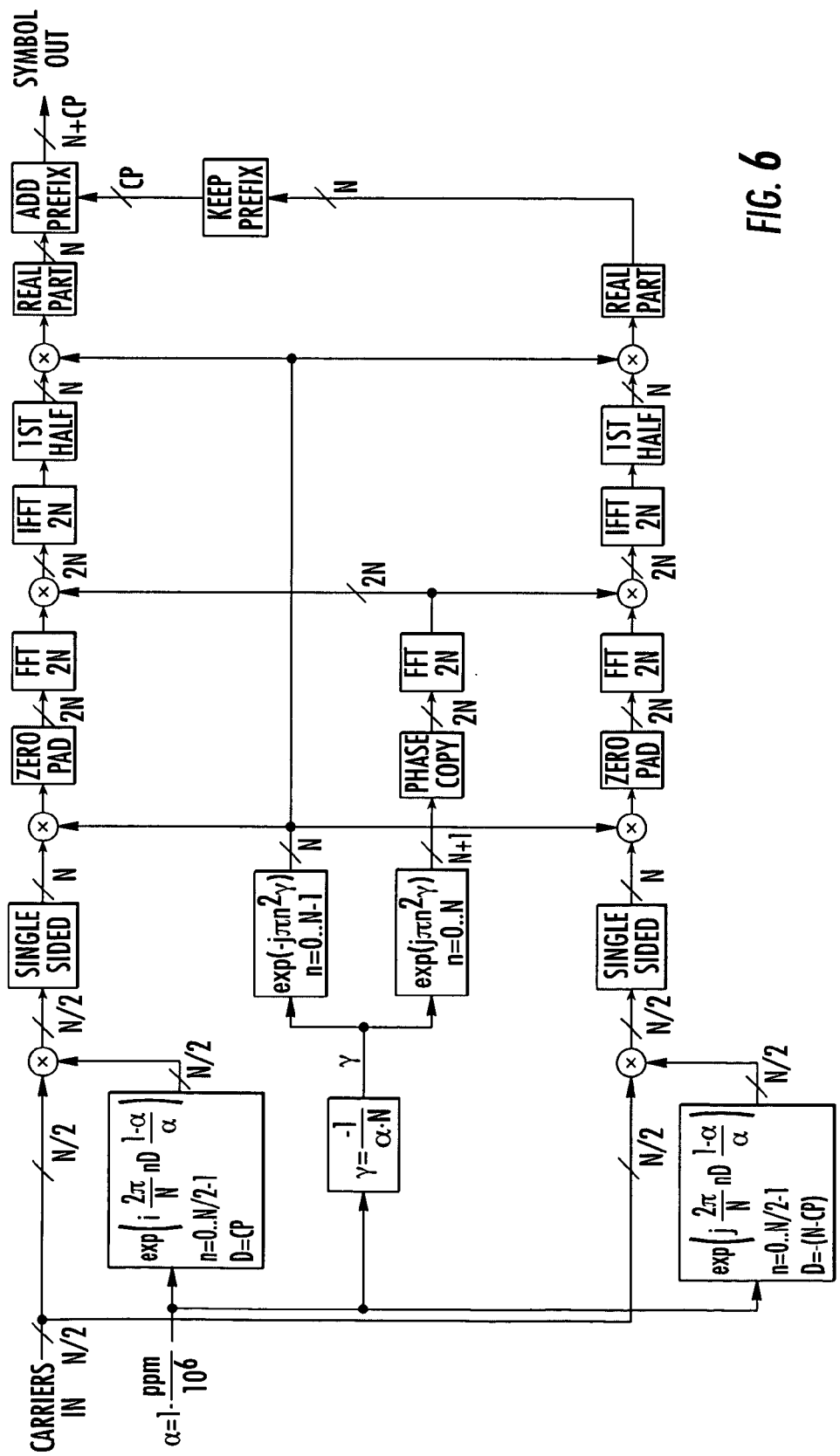

Following the previous derivations, the complete HFI block 70 specified by the function dmt_hfi_interp( ) may be implemented as shown in FIG. 6. As may be seen, this diagram represents essentially an expansion or implementation of the embodiment illustrated in FIG. 4 using the parts shown in FIG. 5. An additional step not shown in FIG. 5 is a multiplication of the carriers at the input by a factor $\exp\{j[2\pi/N]nD[1-\alpha]/\alpha\}$ for n=0.N/2-1, D=CP or D=-(N-CP) respectively to achieve the desired delays. This is followed by a "single-sided" operation. Also, as the other inputs to the three multipliers are common to both the FR-FT blocks, the derivation of these inputs is shared rather than duplicated, to minimize computational load.

Given the presence in the RX path of a time-equalizer, the approach used for the TX path cannot be applied directly. Thus, the received symbol, sampled with the local clock, needs to be interpolated and output in the same domain to enable it to be passed through the time-equalizer. A well-known technique to do time interpolation with a normal DFT exists and may be extended for a fractional delay by the fractional Fourier transform. A notable advantage over the classical DFT approach is that the complexity of the resulting interpolator does not depend on the fractional delay.

The same notation as for the function delay_hfi_interp( ) is used. The input argument 'x' now represents the received symbol in the time domain. The time domain fractional interpolator is specified as follows:

```
% Time-to-Time Fractional Interpolator . . .
% x=input symbol (N samples)
% ppm=clock mismatch
% delay= . . . in samples
% y=interpolated symbol
%
function y=delay_tdfi_interp(x, ppm, delay)
N=length(x);
alpha=1-ppm/1e6;
Y=ifft(x).*exp(-sqrt(-1)*2*pi/N*(0:N-1)*delay*(1-alpha)/alpha).';
Z=fftshift([Y(1)/2; Y(2:N/2); Y(N/2+1)/2; zeros(N/2-1,1)]);
y=2*real(fast_frf(Z, 1/alpha/N).*exp(sqrt(-1)*pi*(0:N-1)/alpha).');
return;
```

The interpolated prefix 'y_p' and the N-samples symbol 'y_n' are then obtained with two fractional Fourier calls over different parts of the received (N+CP samples long) symbol 'xx', with different delays:

```
N=512;  CP=32;  ppm=251;  % xx is N+CP samples=received DMT
y_n=delay_tdfi_interp(xx(CP+1:N+CP), ppm, CP);
y_p=delay_tdfi_interp(xx(1:N), ppm, 0);
y_p=y_p(1:CP);
```

Figure 7:
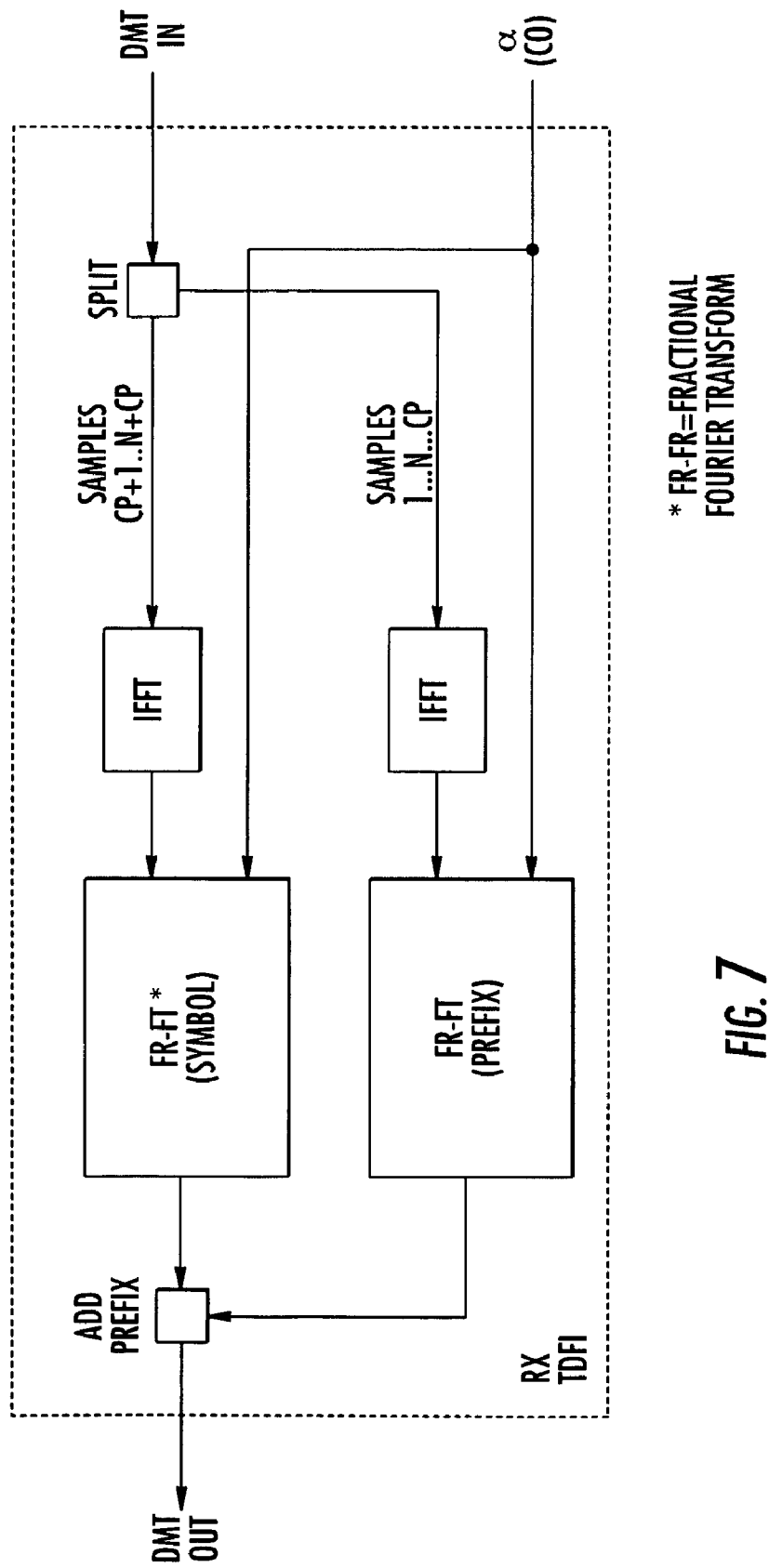
FIGS. 7 and 8 are schematic block diagrams showing certain aspects of the clock compensation arrangement of FIG. 2 for a receive path.
Figure 8:
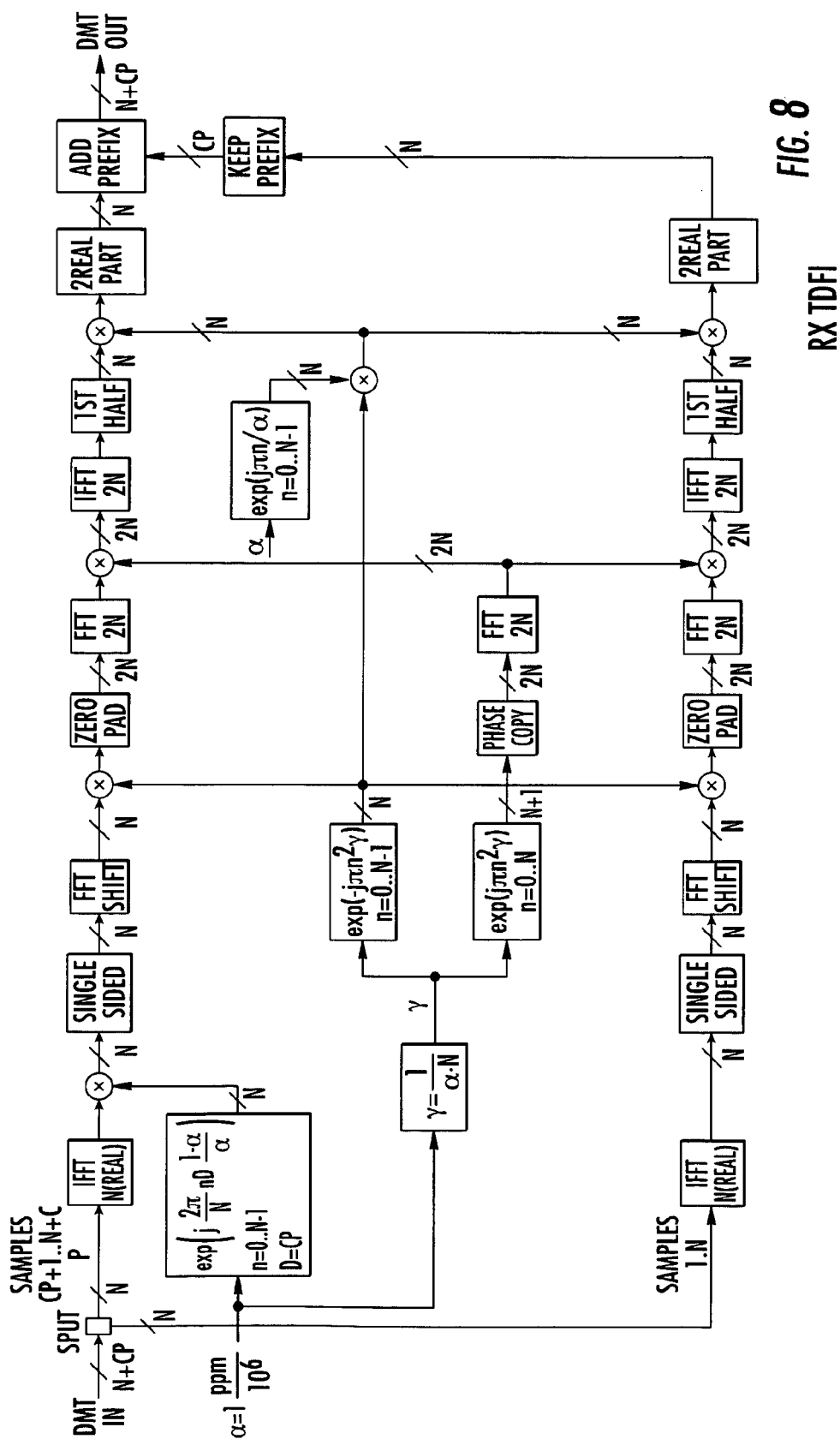

The complete fractional interpolator for the RX path involves combining the interpolation of the symbol and prefix in a single block/function where the redundancies are minimized by sharing common exponential factors. A high level view is shown in FIG. 7, and more detail of an exemplary implementation is shown in FIG. 8. Again, as the other inputs to the three multipliers are common to both the FR-FT blocks, the derivation of these inputs is shared rather than duplicated, to minimize computational load. First the Matlab representation is set out:

```
% DMT Time-to-Time Fractional Interpolator . . .
% xx=input symbol (N+CP samples)
% ppm=clock mismatch
% CP=cyclix prefix size in samples
% [yn,yp]=interpolated symbol,prefix
%
function [yn, yp]=dmt_tdfi_interp(xx, ppm, CP)
```

N=length(xx)-CP;
alpha=1-ppm/1e6;
gamma=1/alpha/N;
A=exp(-sqrt(-1)*pi*(0:N-1).^2*gamma).';
B=exp(sqrt(-1)*pi*(0:N).^2*gamma).';
B=fft([B; B(end-1:-1:2)]);
C=A(1:N).*exp(sqrt(-1)*pi*(0:N-1)/alpha). ';
Yn=ifft(xx(CP+1:N+CP)).*exp(-sqrt(-1)*2*pi/N*(0:N-1)*CP*(1-alpha)/alpha).';
Zn=fftshift([Yn(1)/2; Yn(2:N/2); Yn(N/2+1)/2; zeros(N/2-1,1)]);
Yp=ifft(xx(1:N));
Zp=fftshift([Yp(1)/2; Yp(2:N/2); Yp(N/2+1)/2; zeros(N/2-1,1)]);
an=[Zn.*A; zeros(N,1)];
bn=ifft(fft(an).*B);
yn=2 *real(bn(1:N).*C);
ap=[Zp.*A; zeros(N,1)];
bp=ifft(fft(ap).*B);
yp=2*real(bp(1:CP).*C(1:CP));
return;

This specification is ready for a fast hardware implementation of the TDFI that employs standard FFT blocks and multipliers. The fractional interpolator in the RX path of the received symbol has input and output in the time domain, and is achieved by two fractional Fourier transform (FRFT) calls, as shown in FIG. 7. This shows the input signal being split, with samples 1 . . . CP being fed to an IFFT which feeds the FR-FT (PREFIX) part. Samples CP+1 . . . N+CP are fed to an IFFT which feeds FR-FT (SYMBOL). As in FIG. 4, the clock offset α is fed to both FR-FT blocks, and the outputs of the blocks are concatenated. The FR-FT block is again the one shown in FIG. 4.

A complete block diagram for the RX interpolator shown in FIG. 8 follows the Matlab function dmt_tdfi_interp( ) set forth above. It is similar to that of FIG. 6, and so need not be described further. Notably, there is no delay operator at the input to the FR-FT (PREFIX) because the prefix starts at sample 0, i.e., without any delay in position. The prefix is pre-pended to the frame.

Alternative implementations for the RX side clock offset compensation may be used if the TEQ need not be implemented, or it may be implemented elsewhere or in the frequency domain, so that the clock offset outputs may be in the frequency domain. For example, in the latter case a structure is created very similar to the TX HFI but reversed in the order of the FFT/Chirp-Z transforms.

Figure 9:
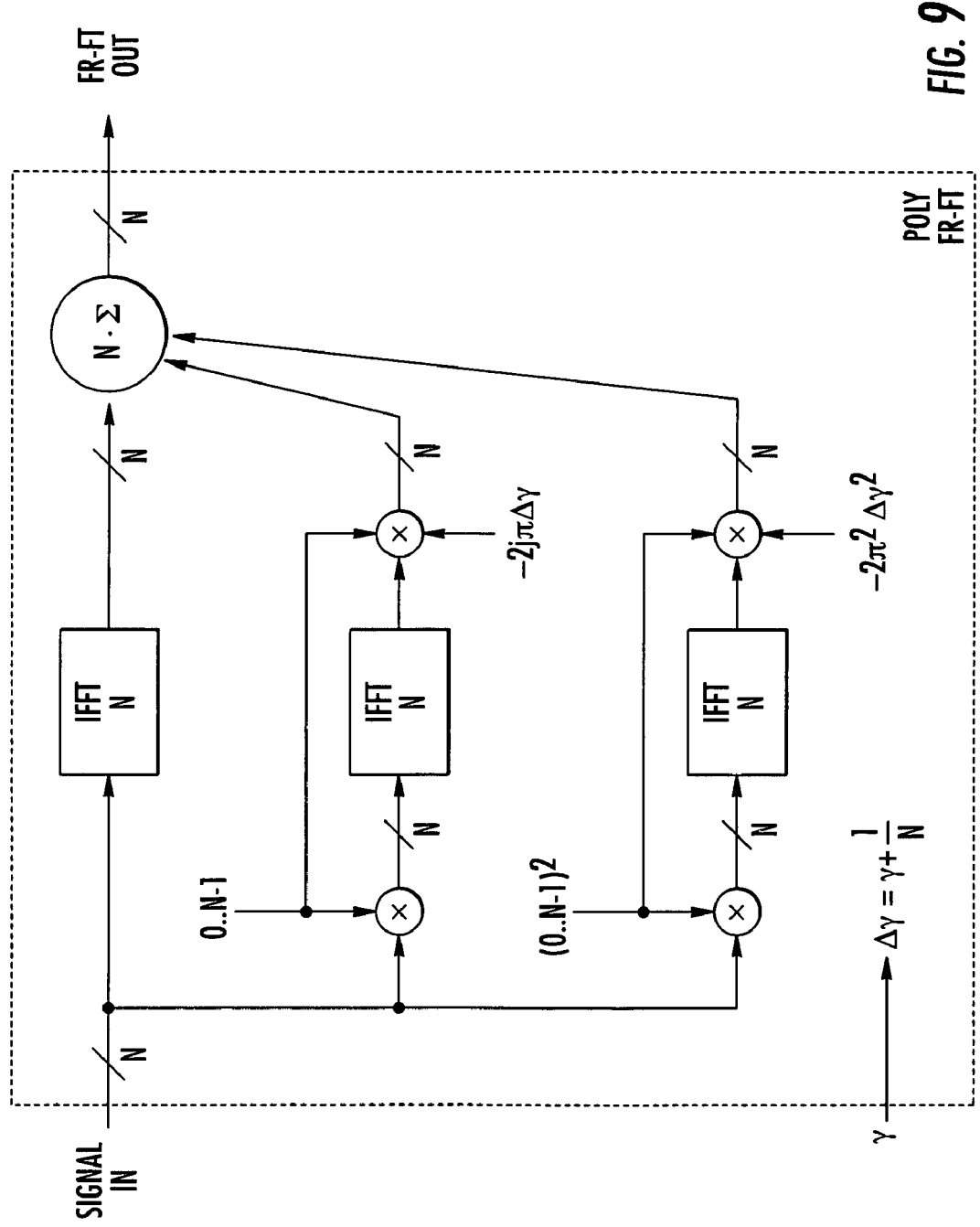
FIG. 9 is a schematic block diagram showing an approximation for a fractional transform in accordance with the present invention.

The structures presented thus far are exact in the sense that they give the performance of an ideal trigonometric interpolator over N samples. To find solutions which are computationally cheaper and still acceptable in terms of performances, the fractional Fourier transform block should be approximated in some way. One way is by series expansion (more suitable for TX path than RX path), and an example thereof is shown in FIG. 9. The argument in each call to the fractional Fourier transform in the TX path is:

$$\gamma = \frac{-1}{\alpha N} = \frac{1}{(1 - ppm \cdot 10^{-6})N} \approx \frac{-1}{N}$$

$$\Delta\gamma = \gamma - \left(\frac{-1}{N}\right) = \frac{ppm}{(ppm - 10^6)N}$$

Δγ is very small, e.g., in the low ppm range of interest. This suggests a Taylor series decomposition of the fractional Fourier kernel around the point −1/N as follows:

$$\exp(-j2\pi nk\gamma) \approx \exp\left(j\frac{2\pi}{N}nk\right) - 2j\pi nk\left(\gamma + \frac{1}{N}\right)\exp\left(j\frac{2\pi}{N}nk\right) +$$
$$-2\pi^2 n^2 k^2 \left(\gamma + \frac{1}{N}\right)^2 \exp\left(j\frac{2\pi}{N}nk\right) + \frac{4}{3}j\pi^3 n^3 k^3 \left(\gamma + \frac{1}{N}\right)^3 \exp\left(j\frac{2\pi}{N}nk\right) + \ldots$$

Thus, the fractional Fourier has been turned into a sum of windowed Fourier transforms applied to windowed versions of the input vector, where the windows are constant, linear, parabolic etc.

$$\left.\begin{array}{l}G_k(s(n), \gamma) = \sum_{n=0}^{N-1} s(k) \cdot \exp(-j2\pi nk\gamma) \\ F_k^{-1}(s(n)) = \frac{1}{N}\sum_{n=0}^{N-1} s(k) \cdot \exp\left(j\frac{2\pi}{N}nk\right)\end{array}\right\} n, k = 0 \ldots N-1$$

$$G_k(s(n), \gamma)\frac{1}{N} \approx$$
$$F_k^{-1}(s(n)) - 2j\pi k F_k^{-1}(n \cdot s(n))\Delta\gamma - 2\pi^2 k^2 F_k^{-1}(n^2 \cdot s(n))\Delta\gamma^2 + \ldots$$

The approximation is good for low tones but degrades rapidly with the tone index. Also, the method is limited by the high dynamic range required to window the input vector. Thus, it is suitable only when the input vector has only a small initial subset which is non-zero. This is the case for the upstream TX path when oversampling is employed in the TX-IFFT. There, only few carriers are active with respect to the number of points N of the IFFT (i.e. carriers 7-31 with N=512).

The block diagram (showing the first, second and the third terms of the series) derived from the equation is shown in FIG. 9. For each term there is an IFFT N part and a pre-multiplier and a post multiplier. The pre-multiplier produces a product of the input signal and a factor and feeds the product to the IFFT N part. The output of the IFFT N part is fed to the post-multiplier, whose output is multiplied by the same factor and another factor derived from the clock offset, to generate the term. All the terms are then summed to give the final output. The factors are given in the equation above. The POLY FR-FT block may be plugged directly in FIG. 4 as a replacement of the 'FR-FT' block. The appropriate delays for the symbol and prefix have to be included as in FIG. 6. The complexity in real multiplications per symbol may be about half the complexity of an HFI TX interpolator.

Figure 10:
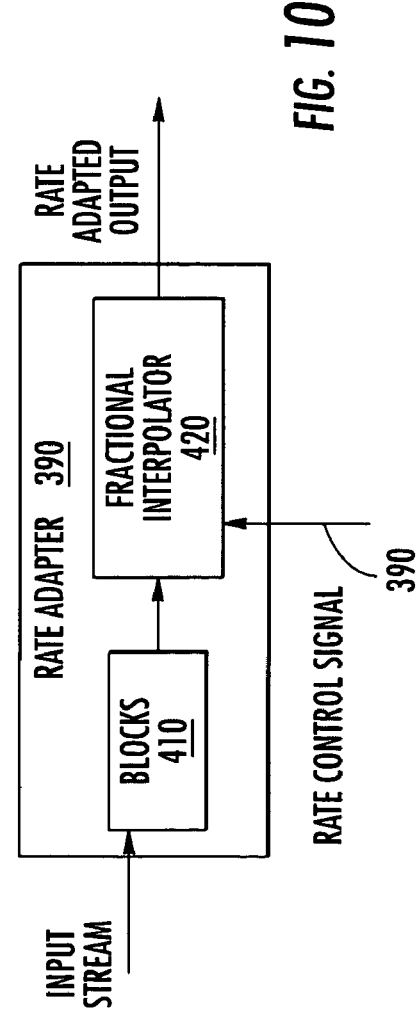
FIG. 10 is a schematic block diagram showing a rate adapter according to the present invention.

Referring now additionally to FIG. 10, an embodiment of the invention for a general-purpose rate adapter 390 is now described. The rate adapter 390 has an input part 410 and a fractional interpolator 420. An input signal is fed to the input 410, which feeds blocks of data to the fractional interpolator 420. The interpolator operates on the blocks according to a rate control signal, to produce a rate adapted output. The input part 410 may be implemented as a storage buffer. The fractional interpolator may be implemented as described above for example. Generally, the two rates are almost the same, the target ppm range is tenths/hundreds of ppm.

As has been described above, a clock offset compensation arrangement in accordance with the invention has a fractional interpolator for applying a trigonometric interpolation to a sampled input signal according to a clock offset signal. It uses transform-based processing in the frequency domain. Compared to a polynomial type interpolation it may be easier to implement, and may achieve a closer approximation to a perfect interpolation. It may reduce the effects of non-linear type errors introduced by truncation of higher powers. The arrangement may be applied to receivers or transmitters of multi-carrier modems, or any application which needs rate adaptation or synchronization.

Any of the functions shown may be implemented using standard software languages or procedures, for execution on standard hardware such as general-purpose microprocessors, DSPs, or application specific integrated circuits, for example. The modem, receiver or transmitter structures may be efficiently implemented with DSP cores, for example, for single chip products. The software includes code which may be executed on any suitable computing device or processing engine having memory such as a microprocessor.

By way of example, such devices may include the Pentium IV processor by Intel Corp. or similar processors, or a programmable gate array such as a field-programmable gate array (FPGA), programmable array logic (PAL), programmable logic array (PLA) or similar. The software may also be stored on a suitable data carrier, e.g., an optical disk such as a CD-ROM, a DVD-ROM, magnetic tape, hard disk, in a memory of a network element in a telecommunications network, or in a personal computer or a work station such as a UNIX workstation.

Other variations will be apparent to those skilled in the art, having corresponding advantages to those set out above, within the scope of the claims. For instance, reference has been made to discrete fast Fourier transforms and their inverses as well as a fractional variation of these. Yet, similar results may be obtained with other wave or wavelet based transforms such as the discrete wavelet transform and its inverse. For the latter, a fractional variant is generated for use in interpolation.

That which is claimed is:

1. A clock offset compensation circuit for compensating a clocked input signal comprising:
    a first input for receiving the clocked input signal;
    a second input for receiving an estimated clock offset signal; and
    a fractional fast Fourier transform interpolator connected to said first and second inputs for applying a trigonometric interpolation to the clocked input signal based upon the received estimated clock offset signal to provide a clock offset compensated signal, with said fractional fast Fourier transform interpolator applying an inverse fast Fourier transform (IFFT) to the clocked input signal in the frequency domain, followed by a chirp Z transform based upon the estimated clock offset signal, to provide the clock offset compensated signal in the frequency domain.

2. The clock offset compensation circuit of claim 1 wherein the clocked input signal comprises a plurality of blocks, and wherein said fractional fast Fourier transform interpolator performs linear transforms on each block.

3. The clock offset compensation circuit of claim 1 wherein the clocked input signal has at least one carrier associated therewith.

4. The clock offset compensation circuit of claim 1 wherein the clock offset compensated signal comprises a plurality of blocks; and wherein said fractional fast Fourier transform interpolator generates time domain guard bands to separate the blocks of the clock offset compensated signal.

5. The clock offset compensation circuit of claim 1 wherein the clocked input signal comprises a plurality of blocks and guard bands arranged therebetween; and wherein said fractional fast Fourier transform interpolator removes the guard bands prior to applying the trigonometric interpolation to the clocked input signal.

6. The clock offset compensation circuit of claim 1 wherein said fractional fast Fourier transform interpolator uses a transform based upon a series expansion.

7. The clock offset compensation circuit of claim 1 wherein the clocked input signal comprises a sampled input signal.

8. An electronic device comprising:
    a clock offset estimator for generating an estimated clock offset signal associated with a clocked input signal; and
    a fractional fast Fourier transform interpolator for applying a trigonometric interpolation to the clocked input signal based upon the estimated clock offset signal to provide a clock offset compensated signal, with said fractional fast Fourier transform interpolator a lying an inverse fast Fourier transform (IFFT) to the clocked input signal in the frequency domain, followed by a chirp Z transform based upon the estimated clock offset signal, to provide the clock offset compensated signal in the frequency domain.

9. The electronic device of claim 8 further comprising:
    a modulator for modulating at least one carrier to generate a carrier signal; and
    a clocked output circuit for generating the clocked input signal based upon the carrier signal;
    said clock offset estimator, fractional fast Fourier transform interpolator, modulator, and clocked output circuit defining a transmitter.

10. The electronic device of claim 9 further comprising a receiver cooperating with said transmitter to define a modem.

11. The electronic device of claim 8 further comprising:
    a demodulator for demodulating a carrier signal; and
    an input circuit for generating the clocked input signal based upon the demodulated carrier signal;
    said clock offset estimator, fractional fast Fourier transform interpolator, demodulator, and input circuit defining a receiver.

12. The electronic device of claim 11 further comprising a transmitter cooperating with said receiver to define a modem.

13. The electronic device of claim 8 wherein the clocked input signal comprises a plurality of blocks, and wherein said fractional fast Fourier transform interpolator performs linear transforms on each block.

14. The electronic device of claim 8 wherein the clock offset compensated signal comprises a plurality of blocks; and wherein said fractional fast Fourier transform interpolator generates time domain guard bands to separate the blocks of the clock offset compensated signal.

15. The electronic device of claim 8 wherein the clocked input signal comprises a plurality of blocks and guard bands arranged therebetween; and wherein said fractional fast Fourier transform interpolator removes the guard bands prior to applying the trigonometric interpolation to the sampled input signal.

16. The electronic device of claim 8 wherein said clock offset estimator and said fractional fast Fourier transform interpolator are implemented in an integrated circuit.

17. A method of clock offset compensation for a clocked input signal comprising:
    generating an estimated clock offset signal associated with the clocked input signal; and
    performing a fractional fast Fourier transform interpolation by applying a trigonometric interpolation to the clocked input signal based upon the estimated clock offset signal to provide a clock offset compensated signal, with the fractional fast Fourier transform interpolation a plying an inverse fast Fourier transform (IFFT) to the clocked input signal in the frequency domain, followed by a chirp Z transform based upon the estimated clock offset signal, to provide the clock offset compensated signal in the frequency domain.

18. The method of claim 17 wherein the clocked input signal comprises a plurality of blocks, and wherein performing the fractional fast Fourier transform interpolator comprises performing linear transforms on each block.

19. A computer-readable medium having computer-executable instructions for causing a clock offset compensation circuit to perform steps comprising:
generating an estimated clock offset signal associated with a clocked input signal; and
performing a fraction fast Fourier transform interpolation by applying a trigonometric interpolation to the clocked input signal based upon the estimated clock offset signal to provide a clock offset compensated signal, with the fractional fast Fourier transform interpolation applying an inverse fast Fourier transform (IFFT) to the clocked input signal in the frequency domain, followed by a chirp Z transform based upon the estimated clock offset signal, to provide the clock offset compensated signal in the frequency domain.

20. The computer-readable medium of claim 19 wherein the clocked input signal comprises a plurality of blocks, and wherein performing the fractional fast Fourier transform interpolator comprises performing linear transforms on each block.

21. A clock offset compensation circuit for compensating a clocked input signal comprising:
a first input for receiving the clocked input signal;
a second input for receiving an estimated clock offset signal; and
a fractional fast Fourier transform interpolator connected to said first and second inputs for applying a trigonometric interpolation to the clocked input signal based upon the received estimated clock offset signal to provide a clock offset compensated signal comprising a plurality of blocks, with said fractional fast Fourier transform interpolator generating time domain guard bands to separate the blocks of the clock offset compensated signal.

22. The clock offset compensation circuit of claim 21 wherein the clocked input signal comprises a plurality of blocks, and wherein said fractional fast Fourier transform interpolator performs linear transforms on each block.

23. The clock offset compensation circuit of claim 21 wherein the clocked input signal comprises a clocked frequency domain signal, and wherein said fractional fast Fourier transform interpolator provides the clock offset compensated signal in the time domain.

24. The clock offset compensation circuit of claim 21 wherein the clocked input signal comprises a clocked time domain signal, and wherein said fractional fast Fourier transform interpolator provides the clock offset compensated signal in the time domain.

25. An electronic device comprising:
a clock offset estimator for generating an estimated clock offset signal associated with a clocked input signal; and
a fractional fast Fourier transform interpolator for applying a trigonometric interpolation to the clocked input signal based upon the estimated clock offset signal to provide a clock offset compensated signal comprising a plurality of blocks, with said fractional fast Fourier transform interpolator generating time domain guard bands to separate the blocks of the clock offset compensated signal.

26. The electronic device of claim 25 further comprising:
a modulator for modulating at least one carrier to generate a carrier signal; and
a clocked output circuit for generating the clocked input signal based upon the carrier signal;
said clock offset estimator, fractional fast Fourier transform interpolator, modulator, and clocked output circuit defining a transmitter.

27. The electronic device of claim 26 further comprising a receiver cooperating with said transmitter to define a modem.

28. The electronic device of claim 8 further comprising:
a demodulator for demodulating a carrier signal; and
an input circuit for generating the clocked input signal based upon the demodulated carrier signal;
said clock offset estimator, fractional fast Fourier transform interpolator, demodulator, and input circuit defining a receiver.

29. The electronic device of claim 28 further comprising a transmitter cooperating with said receiver to define a modem.

30. An electronic device comprising:
a clock offset estimator for generating an estimated clock offset signal associated with a clocked input signal;
a fractional fast Fourier transform interpolator for applying a trigonometric interpolation to the clocked input signal based upon the estimated clock offset signal to provide a clock offset compensated signal;
a modulator for modulating at least one carrier to generate a carrier signal; and
a clocked output circuit for generating the clocked input signal based upon the carrier signal;
said clock offset estimator, fractional fast Fourier transform interpolator, modulator, and clocked output circuit defining a transmitter.

31. The electronic device of claim 30 further comprising a receiver cooperating with said transmitter to define a modem.

32. The electronic device of claim 30 further comprising:
a demodulator for demodulating a carrier signal; and
an input circuit for generating the clocked input signal based upon the demodulated carrier signal;
said clock offset estimator, fractional fast Fourier transform Interpolator, demodulator, and input circuit defining a receiver.

33. The electronic device of claim 32 further comprising a transmitter cooperating with said receiver to define a modem.

34. A method of clock offset compensation for a clocked input signal comprising:
generating an estimated clock offset signal associated with the clocked input signal; and
performing a fractional fast Fourier transform interpolation by applying a trigonometric interpolation to the clocked input signal based upon the estimated clock offset signal to provide a clock offset compensated signal comprising a plurality of blocks, with the fractional fast Fourier transform interpolation generating time domain guard bands to separate the blocks of the clock offset compensated signal 35. The method of claim 34 wherein the clocked input signal comprises a plurality of blocks, and wherein perform ing the fractional fast Fourier transform interpolator comprises performing linear transforms on each block.

36. The method of claim 34 wherein the clocked input signal comprises a clocked frequency domain signal, and wherein the clock offset compensated signal is in the time domain.

37. The method of claim 34 wherein the clocked input signal comprises a clocked time domain signal, and wherein the clock offset compensated signal is in the time domain.

* * * * *

UNITED STATES PATENT AND TRADEMARK OFFICE
CERTIFICATE OF CORRECTION

PATENT NO. : 7,460,587 B2
APPLICATION NO. : 10/745948
DATED : December 2, 2008
INVENTOR(S) : Fabio Pisoni It is certified that error appears in the above-identified patent and that said Letters Patent is hereby corrected as shown below:

Column 1, Line 10     Delete: "an related methods."
Insert: -- and related methods. --

Column 1, Line 19     Delete: "ther information on these system may be found in "ADSL,"
Insert: -- ther information on these systems may be found in "ADSL, --

Column 8, Line 61     Delete: " $= 2\pi\left(\bar{k}\frac{F_b}{N}\right)\cdot nT_0$ "

Insert: -- $= 2\pi\left(\bar{k}\frac{F_0}{N}\right)\cdot nT_0 \frac{ppm}{10^6 - ppm}$ --

Column 8, Line 63     Delete: " $= \frac{ppm}{10^6 - ppm}$ "

Insert: -- $= \frac{2\pi}{N}\bar{k}n\frac{ppm}{10^6 - ppm}$ --

Column 8, Line 65     Delete: " $= \frac{2\pi}{N}\bar{k}n\frac{ppm}{10^6 - ppm} = \frac{2\pi}{N}\bar{k}n\left(\frac{1-\alpha}{\alpha}\right)$ "

Insert: -- $= \frac{2\pi}{N}\bar{k}n\left(\frac{1-\alpha}{\alpha}\right)$ --

Column 9, Line 14     Delete: " $X(h\alpha) = \frac{1-e^{-j2\pi h\alpha}}{N}\sum_{k=-N/2}^{N/2-1}\frac{X(h)}{1-e^{-j2\pi/N(h\alpha-k)}}$ "

Insert: -- $X(h\alpha) = \frac{1-e^{-j2\pi h\alpha}}{N}\sum_{k=-N/2}^{N/2-1}\frac{X(k)}{1-e^{-j2\pi/N(h\alpha-k)}}$ --

Column 9, Line 37     Delete: " $= \sum_{n=0}^{N-1}\left[\sum_{k=0}^{N-1}X_a(k)e^{j2kn/N}\right] - e^{-j2\pi m\alpha n/N}$ "

Insert: -- $= \sum_{n=0}^{N-1}\left[\sum_{k=0}^{N-1}X_a(k)e^{j2kn/N}\right]e^{-j2\pi m\alpha n/N}$ --

UNITED STATES PATENT AND TRADEMARK OFFICE
CERTIFICATE OF CORRECTION

PATENT NO. : 7,460,587 B2
APPLICATION NO. : 10/745948
DATED : December 2, 2008
INVENTOR(S) : Fabio Pisoni It is certified that error appears in the above-identified patent and that said Letters Patent is hereby corrected as shown below:

Column 9, Line 58   Delete: "Z-Transform transform exist with complexity O(N*log(N))," 
Insert: -- Z-Transform exist with complexity O(N*log(N)), --

Column 11, Line 13   Delete: "of) over the single side spectrum $\bar{X}_s$ (k) k=0 ... N-1 obtained"
Insert: -- of) over the single side spectrum $\tilde{X}_s(k)$ k=0 ... N-1 obtained --

Column 18, line 19   Delete: "Fourier transform interpolator a lying an inverse fast"
Insert: -- Fourier transform interpolator applying an inverse fast --

Column 19, Line 4   Delete: "tion a plying an inverse fast Fourier transform (IFFT) to"
Insert: -- tion applying an inverse fast Fourier transform (IFFT) to --

Signed and Sealed this

Eighteenth Day of August, 2009

David J. Kappos
*Director of the United States Patent and Trademark Office*